United States Patent [19]
DeLano et al.

[11] Patent Number: 5,787,494
[45] Date of Patent: Jul. 28, 1998

[54] SOFTWARE ASSISTED HARDWARE TLB MISS HANDLER

[75] Inventors: Eric R. DeLano, Fort Collins; Michael A. Buckley, Windsor; Duncan C. Weir, Loveland, all of Colo.

[73] Assignee: Hewlett-Packard Company, Palo Alto, Calif.

[21] Appl. No.: 532,948

[22] Filed: Sep. 22, 1995

Related U.S. Application Data

[63] Continuation of Ser. No. 957,345, Oct. 6, 1992, Pat. No. 5,493,660.
[51] Int. Cl.⁶ .................................................. G06F 12/10
[52] U.S. Cl. ................................................... 711/206
[58] Field of Search ................................. 395/416, 417; 711/206, 207

[56] References Cited

U.S. PATENT DOCUMENTS

| | | | |
|---|---|---|---|
| 4,774,653 | 9/1988 | James | 711/217 |
| 5,060,137 | 10/1991 | Brya et al. | 395/250 |
| 5,493,660 | 2/1996 | DeLano et al. | 711/216 |

Primary Examiner—Jack A. Lane

[57] ABSTRACT

The present invention provides a software-assisted hardware TLB miss-handler which is designed to reduce the TLB miss penalty while being low cost to implement and requiring little chip area or complexity. When a TLB miss occurs, the HW TLB miss handler of the present invention computes a physical address of a page table entry located in a special hardware-visible table based on a missing virtual address. It accesses the page table entry and checks for a correct translation and status information. If correct, a physical page address and protection information of the page table entry are inserted into the TLB. The original virtual address is re-translated and normal program execution continues. If the correct translation and status are not found, the HW TLB miss-handler will not insert the entry and will trap to a more sophisticated SW TLB miss handler. A pointer to the page table entry is passed to the SW TLB miss handler so that the page table address need not be recomputed. Thus, the HW TLB miss-handler of the present invention services the simplest and most common TLB misses very quickly, reducing the overall TLB miss penalty. The slower SW TLB miss handler services the more complex and less common TLB misses and provides flexibility in the virtual memory management system.

13 Claims, 3 Drawing Sheets

SOFTWARE ASSISTED HARDWARE TLB MISS HANDLER

CROSS REFERENCE TO RELATED APPLICATION

This is a continuation of copending application Ser. No. 07/957,345 filed on Oct. 6, 1992 now U.S. Pat. No. 5,493,660.

BACKGROUND OF THE INVENTION

1. Field of the Invention

The present invention relates generally to the design of a virtual memory management system and, more particularly, to a software assisted hardware Translation Lookaside Buffer (TLB) miss handler which reduces the TLB miss penalty associated with access to a memory system.

2. Discussion of Related Art

Conventional computer processing systems use a technique called virtual memory which simulates more memory than actually exists and allows the computer to run several programs concurrently regardless of their size. Concurrent user programs access main memory addresses via virtual addresses assigned by the operating system. The mapping of the virtual addresses to the main memory or the physical addresses is a process known as virtual memory translation. Virtual memory translation can be accomplished by any number of techniques so that the processor can access the desired information in the main memory.

Addresses, physical or virtual, consist of a page number and a byte position within the page. For main memory access, the page number needs to be translated from virtual to physical (real) address space; the position of the byte within the page is the same for both virtual and physical addresses.

Translations for all pages in memory are often stored in a memory structure called a page directory (PDIR) or page table. Page tables can be organized in a number of structures. "Forward-mapped" tables are most easily accessed using the virtual page number as a pointer to the table entry containing the translation. "Reverse-mapped" tables are most easily accessed using the physical page number as a pointer to the table entry containing the translation. Since there are many more possible virtual page numbers than physical page numbers, forward-mapped tables can be very large and sparse, but fairly easily searched given the virtual page number. A reverse-mapped table contains one entry for each page of physical memory. Since there are a limited number of physical pages, compared to virtual pages, reverse-mapped tables tend to be more efficient storage structures, but more difficult to access given only the virtual page number.

Each page table entry typically contains the virtual address and/or the physical address, and protection and status information concerning the page. Status typically includes information about the type of accesses the page has undergone. Examples are a reference bit, which identifies the first access to data in the page, and a dirty bit which identifies the first modification to data in the page.

Page tables are usually so large that they are stored in the main memory. Thus, each regular memory access can actually require two accesses, one to obtain the translation and a second to access the memory location.

Many computer systems that support virtual memory translation use a hardware structure called a translation lookaside buffer (TLB). The TLB is a small, fast, associative memory which is usually situated on or in close proximity to the processor unit and stores recently used pairs of virtual and physical addresses. The TLB contains a subset of the translations in the page table and can be accessed much more quickly. When the processing unit needs information from main memory, it sends the virtual address to the TLB. The TLB accepts the virtual page address and returns a physical page address. The physical page address is recombined with the byte position and used to access main memory. However, since access to the main memory is often quite time consuming, many computer systems employ a cache memory for interfacing the main memory to the processor.

Cache memories are high-speed memories that are placed between microprocessors and main memories. They store copies of main memory that are currently in use in order to speed microprocessor access to requested data and instructions. Caches appear today in every class of computer and in some computers more than once. Cache systems typically include a data cache (D-cache) and an instruction cache (I-cache). In order to achieve the speed necessary to aid in microprocessor performance, cache memories are typically built using fast static random access memory circuits (SRAMs). Cache memories provide rapid access to frequently used instructions and data. When properly implemented, a cache memory can typically have an access time which is three to twenty times faster than that of main memory, thus reducing the overall access time. The main advantage of using a cache is that a larger, relatively slow main memory can be made to emulate the high speeds of a cache. For a more in depth discussion of cache memory design and operation see Alan J. Smith, *Cache Memory Design: An Evolving Art*, IEEE Spectrum, pp.40–44 (December 1987) and Hennessy et al., *Computer Architecture a Quantitative Approach*, Morgan Kaufmann Publishers (1990), both of which are incorporated by reference in their entirety.

Cache memories may be organized for access using either virtual or physical addresses. Many physical addressed caches depend upon the TLB to supply the physical address translation before beginning the data access. Another approach is to access the cache with the byte position address in parallel with the TLB translation and compare the physical page address from the TLB with a physical page address tag stored with the cache data.

Since the TLB has limited capacity—typically anywhere from 4 to 512 entries—it may not hold the match for a given virtual address. When a virtual page address translation is not found in the TLB, a TLB miss occurs. When this happens, the TLB refers to the page table. The real address from the page table is sent to the TLB, which retains a copy of it for possible reuse and forwards the real address to the cache. When the TLB is full it discards an old address translation to make room for the new one. Accessing the page table is much slower than the TLB, and using it adds time to the information retrieval process.

Servicing a TLB miss involves calculating if and where the correct translation lies in the page table. The page table is searched and if the translation is found, it must be inserted into the TLB along with other information associated with the page before normal program execution may continue. Often, the page table entry must be modified to update status information concerning the page. Page table entries may be organized to reflect the most recent page access patterns, thus lessening the search time associated with the TLB miss penalties that occur later in time. If the translation is not found, then the page may be absent from memory (called a 'page fault'). Virtual memory management software must step in to recover a page fault. When the missing page is brought into memory from disc, the page table entry corresponding to the new physical page must be updated with the new translation, protection, and status information.

The time required to service the TLB miss is called the TLB miss penalty, because normal program execution is suspended while searching for the virtual address translation. If the TLB miss penalty is lengthy and TLB misses are frequent, user programs suffer degraded performance.

Sophisticated software routines called software (SW) TLB miss handlers are typically used to service TLB misses and manage the page table. Many operating systems have their own specific virtual memory management schemes tuned to a set of expected user applications. Each may organize and manage the page tables differently. Software provides the flexibility to meet these requirements, but often at the expense of increasing the TLB miss penalty and decreasing application performance. In particular, SW TLB miss handlers are not very efficient at performing the most frequent task of servicing simple TLB misses. In other words, TLB misses that do not require a complete traversal of the page table or any page table management.

Most conventional computer architectures use only a single level TLB. However, some architectures have increased performance by implementing a second level TLB in the cache data array. One such design is the MIPS RC6280 CPU. Second level TLBs are hardware units which typically store many more entries than the primary TLB, but have slower access time (though not as slow as main memory). The second level TLB is usually implemented outside of the CPU chip either in memory units separate from the cache or in a reserved portion of the cache memory not used for cache data lines or tags. If the primary TLB does not contain the virtual address translation, then the secondary TLB is checked. If neither TLB contains the translation, a TLB miss is signaled and software retrieves the translation from a physical page directory in memory.

Second level TLB implementations which require additional memory or reserved memory in the cache or tag RAMS to hold translation increase the cost of the cache system as a whole. Accessing this reserved memory requires additional address pads/pins on the processor chip which generally increases the cost of the chip and/or precluded the pads/pins from use for other functions. Moreover, additional processor control functions have to be implemented to manage the second level TLB accesses.

SUMMARY OF THE INVENTION

The present invention provides a software-assisted hardware (HW) TLB miss-handler which is designed to reduce the TLB miss penalty while being low cost to implement and requiring little chip area or complexity. When a TLB miss occurs, the HW TLB miss handler of the present invention computes a physical address of a page table entry located in a special hardware-visible table based on a missing virtual address. It accesses the page table entry and checks for a correct translation and status. If correct, a physical page address and protection information of the page table entry are inserted into the TLB. The original virtual address is re-translated and normal program execution continues. If the correct translation and status are not found, the HW TLB miss-handler will not insert the entry and will trap to a more sophisticated SW TLB miss handler. A pointer to the page table entry is passed to the SW TLB miss handler so that the page table address need not be recomputed. The pointer will either contain the address of a current page table entry or a next page table entry.

This simple HW TLB handler can be used with multiple page table organizations required by different operating systems. The HW TLB handler only accesses entries that have a high probability of existing in the page table, and because of this the remainder of the page table may be organized in any fashion suitable to the operating system. In fact, the operating system may implement any page table organization, and simply maintain a copy of it in a form the HW TLB miss-handler can access. This portion of the page table is called a hardware visible page table. In any case, the hardware visible page table resides in main memory, and copies of recently used page table entries will be available in cache memory. The HW TLB handler may access the page table entry at either level of the memory hierarchy.

A SW TLB miss-handler assists the HW TLB handler by servicing TLB misses which require translations not contained in the hardware-visible table. The SW TLB miss-handler further assists with the HW TLB miss-handler with modifications to any of the page table entries and/or management of the page tables. The HW TLB miss-handler of the present invention services the simplest and most common TLB misses very quickly, reducing the overall TLB miss penalty. A slower SW TLB miss handler services the more complex and less common TLB misses and provides flexibility in the virtual memory management system.

BRIEF DESCRIPTION OF THE DRAWINGS

The above and further advantages of this invention may be better understood by referring to the following description taken in conjunction with the accompanying drawings, in which.

DETAILED DESCRIPTION OF THE PRESENT INVENTION

An example of an overall system which incorporates an embodiment of the present invention is generally described in an article by Delano et al., *A High Speed Superscalar PA-RISC Processor*, COMPCOM Computer Convention (February 1992), which is incorporated by reference herein. The environment described in this article is selected for illustration purposes only. It is an example of one of many computer systems in which the present invention could be used.

Figure 1:
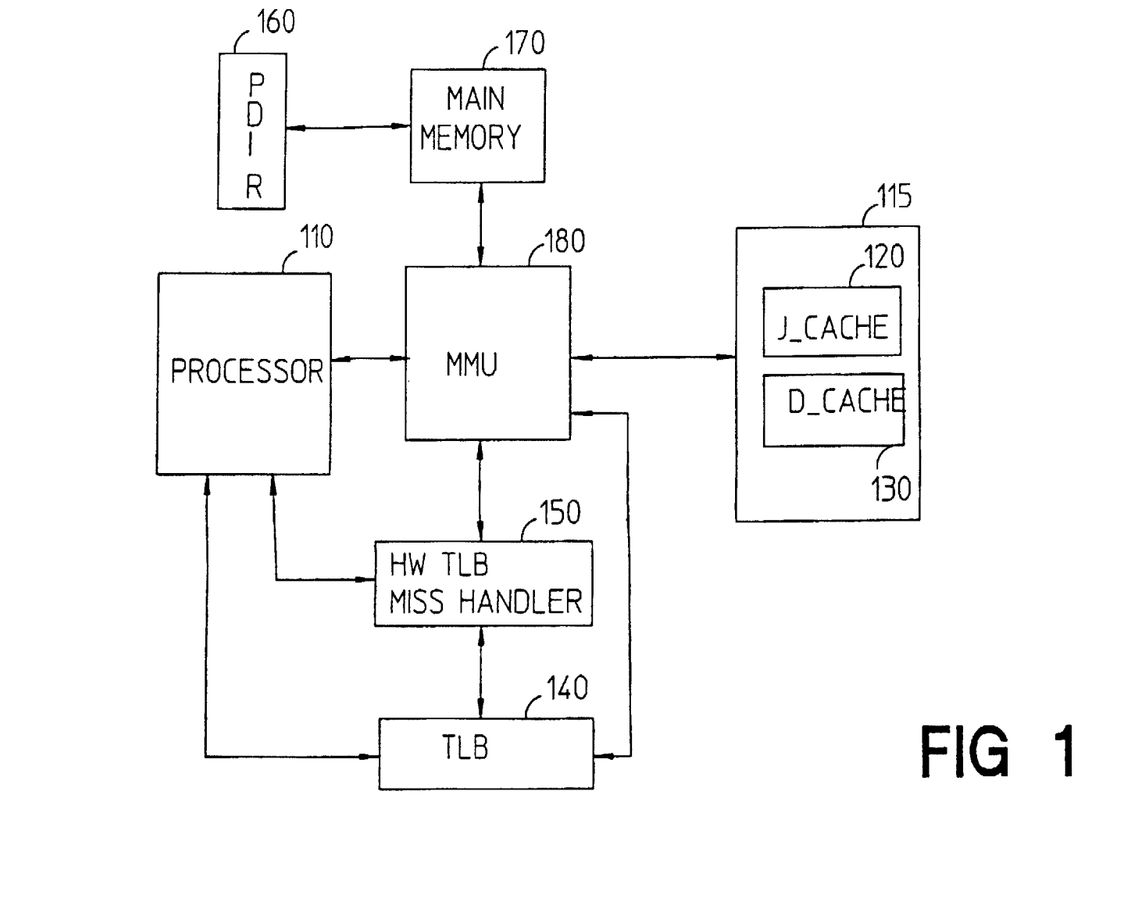
FIG. 1 shows a block diagram of the general environment of the present invention.

Referring to FIG. 1, a processor chip 110 connects via a memory management unit (MMU) 180 to an external 64-bit wide instruction cache 120 (I_Cache) and an external 64-bit wide data cache 130 (D_Cache), both located in a cache memory system. These caches are direct mapped and are composed of industry standard high speed SRAMs which are cycled at the processor frequency. At 100 MHz, each cache has a read bandwidth of 800 MB/sec and a write bandwidth of 400 MB/sec. The processor chip supports a D-Cache size from 4K up to 2 Mbytes and a I-Cache size from 4K up to 1 Mbyte. Note that the present invention can be implemented in any computer-based system that utilizes a translation buffer. Also note that the present invention is not limited to computer-based systems that only use a single level cache memory. Moreover, the present invention is not limited to computer-based systems that utilize cache memories. The present invention has the same advantages over a software TLB miss-handler whether a cache exits or not.

In a preferred embodiment cache lines are 32 bytes (8 words). Lines are copied from a main memory 170 to the cache 115 in 4 byte units, thus a copy requires 8 cycles. The processor 110 posts (or retrieves) lines in cache 115 in either words (4 bytes) or double words. Of course, other system configurations can also be used, and as such, the present invention applies to caches having various line sizes, cache datapath widths, and copy-in rates and widths. The cache addresses are hashed in a conventional manner to reduce the cache miss rate.

There are essentially three types of cache system organizations: (1) a virtual cache; (2) a real cache with TLB translation in series; and (3) a real cache access with TLB translation in parallel. In a system that implements a virtual cache the processor issues a virtual address to the cache and the cache returns data if a hit occurs. No TLB translation is required for the cache since a physical address is not used to access the cache. The TLB is required, however, to make protection checks. In a system implementing a real cache with TLB translation in series, the processor issues a virtual address to the TLB, which translates to a real address. The real address is used to access the cache and the cache returns data if a hit occurs. This is slow since TLB access is in series with the cache access. Finally, in a system that implements a real cache with TLB translation in parallel, the processor issues a virtual address to the TLB which translates it to a real address. At the same time, one or more cache entries are accessed based on certain MSBs of the virtual address. The cache returns data and an associated real address(es). The real address from the cache is compared with the real address from the TLB to see if a hit occurred. This is much faster since accesses are in parallel.

A preferred embodiment of the present invention implements a real cache with TLB translation in parallel (and the discussion below assumes the same). However, any cache organization can be used in conjunction with the software-assisted hardware TLB miss-handler of the present invention. There will of course be minor operational differences depending on which cache organization is utilized. Those skilled in the art would readily be able to make the necessary changes in order to realize the advantages of the present invention.

The processor 110 is also connected via the MMU 180 to a main memory unit 170. Main memory 170 holds data and instructions needed by the processor 110. Translations for all pages in memory are stored in a physical page directory (PDIR) 160 (also called a page table). The PDIR 160 contains one entry for each page of physical memory. A TLB 140 contains a subset of these translations and can be accessed much more quickly than the PDIR 160.

The PDIR 160 resides in main memory 170. As PDIR entries are needed, the MMU 180 copies the entries to cache memory 115 where they can be accessed by the hardware or software miss handlers. Thus recently used PDIR entries can be accessed quickly in cache memory 115. Note, the MMU 180 does not handle PDIR entry misses any differently than any other data cache miss.

Figure 2:
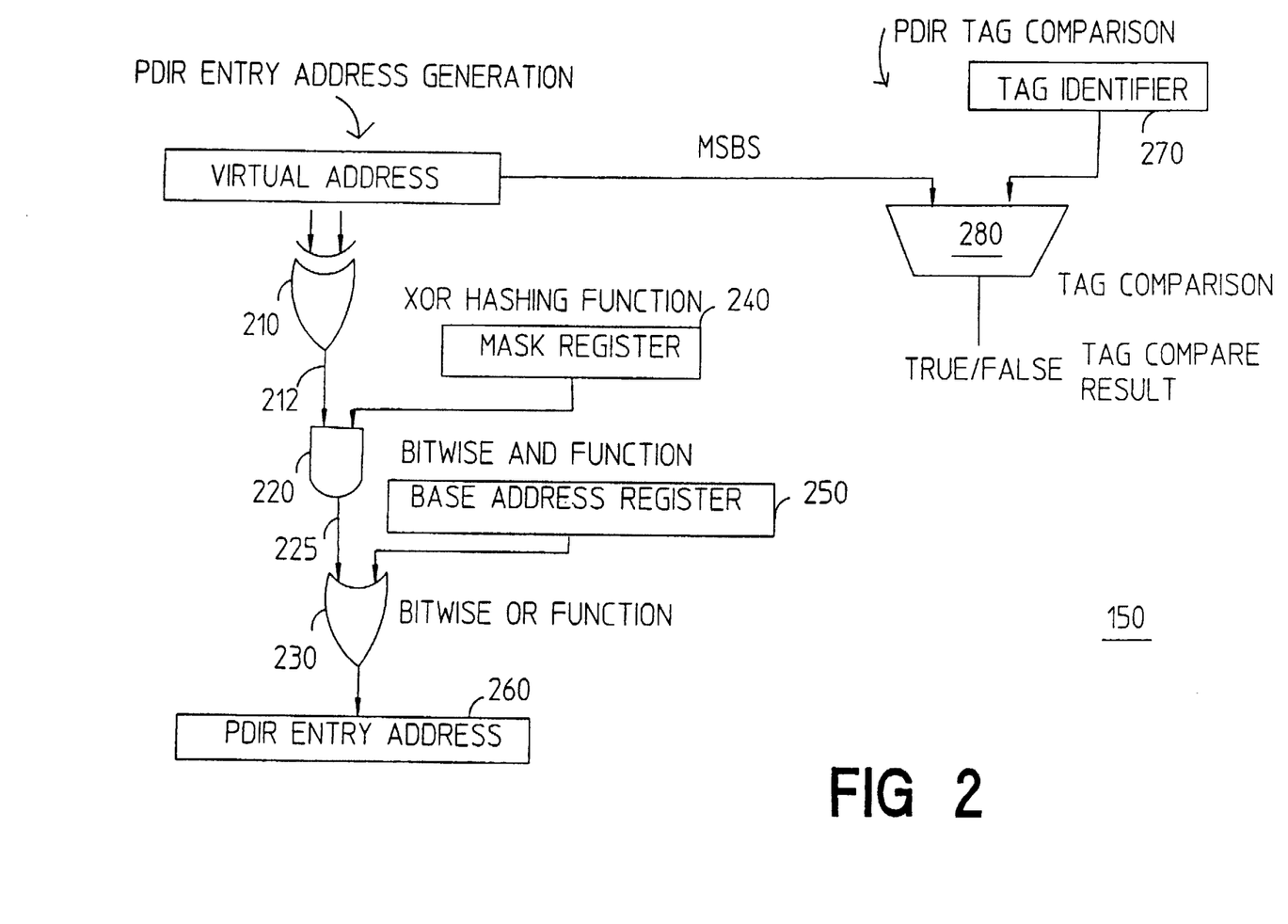
FIG. 2 illustrates PDIR address generation, tag comparison, and registers for handling the same.
Figure 3:
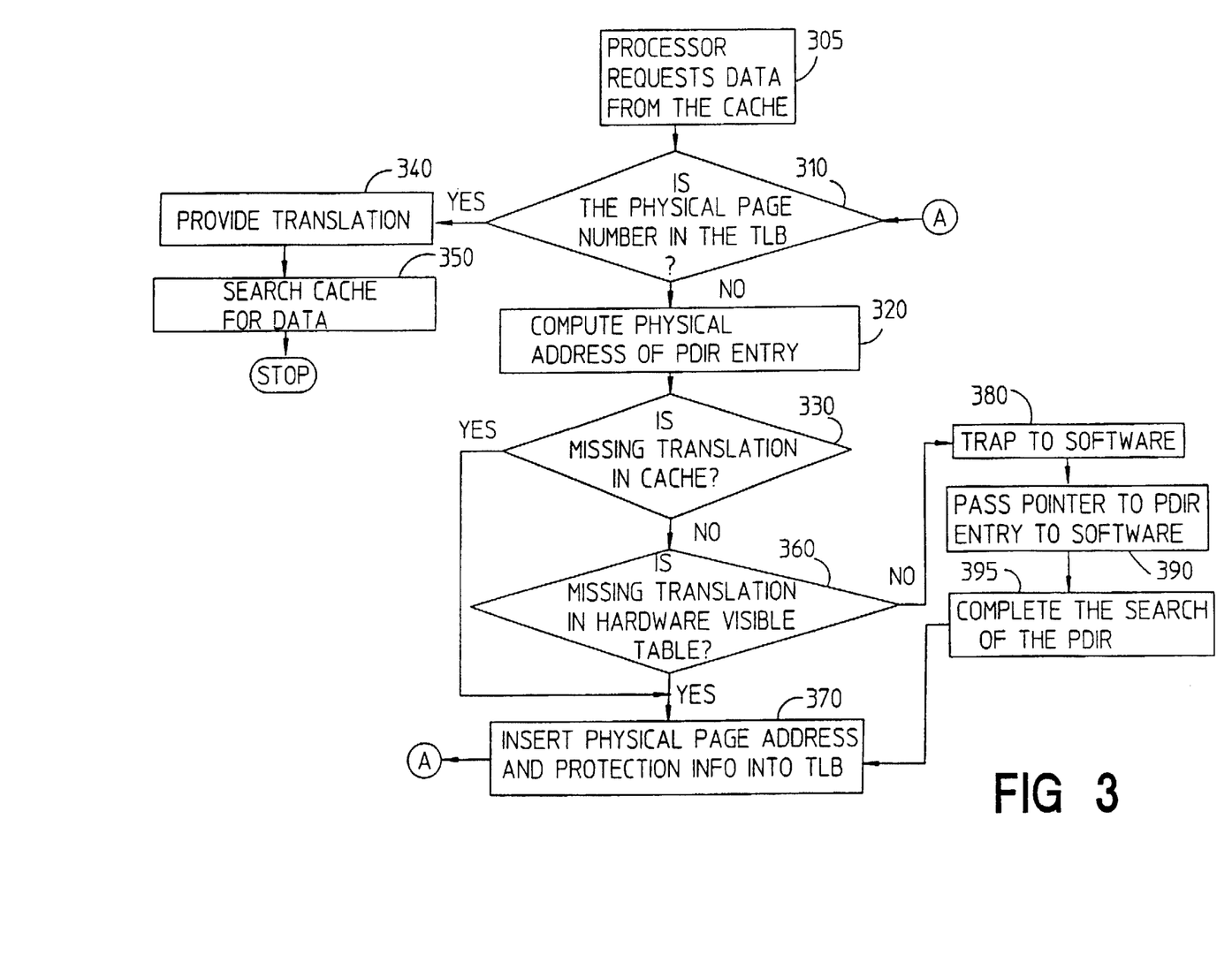
FIG. 3 shows a flowchart of the method of the present invention.

FIG. 3 shows a flowchart that shows the operation of the software assisted hardware TLB miss-handler. In describing FIG. 3, reference will also be made to elements shown in FIGS. 1 and 2. Under normal program execution, and as shown in step 305, the processor 110 initially checks the cache memory 115 for the data and/or instruction. Only upon a cache miss, does the processor 110 accesses the main memory 170. In order to determine if the data and/or instructions are in the cache memory 115, the processor 110 must first obtain the physical page number from the TLB 140, as shown in step 310.

The processor 110 provides a virtual page address to the TLB 140. Addresses, real or virtual, consist of a page number and a byte position within the page. The page number needs to be translated from virtual to real; the byte within the page is the same for both virtual and real addresses. The TLB 140 is associatively searched for the presence of the same virtual page address. If there is a match (i.e., a hit), then the TLB 140 provides a translation (i.e., a real address) for the page, as shown in step 340. The cache memory 115 is then checked to determine whether a specific line from that physical page is resident in the cache memory 115, as shown in block 350. If there is no translation in the TLB 140, the translation must be retrieved from the PDIR 160 before the cache memory 160 can be checked.

In a preferred embodiment, the entire page table (PDIR 160) is organized as a hashed page translation table (HPTT). The HPTT is similar to a reverse mapped page table, known to those skilled in the art, because it contains one entry for each physical page of memory. The HPTT differs from a reverse mapped page table because it is accessed via pointer that is a function of the virtual address. Since many virtual addresses may map to a limited number of physical page addresses, a pointer into the HPTT is constructed by performing a many-to-one function called "hashing" on the virtual address. The hashing function reduces the size of the PDIR 160 in such a way that the PDIR 160 need only be the size of the number of physical pages in main memory 170 (this number would be much smaller than the number of virtual pages). Collisions created by multiple addresses hashing to the same entry are resolved using a sequential linked list of entries in the PDIR 160. Frequent collisions due to similar low order address locality of concurrent processes are avoided by using a hashing function which provides a more uniform distribution of the virtual address domain over the pointer range during multiprogram execution. The linked list of entries is traversed until the entry containing the missing virtual to physical translation is found or until the list ends. Each linked list can be optimized so that the most likely missing translations appear at the top of the list. The first entry in each linked list represents a hardware-visible table, which is accessible by a HW TLB miss-handler 150 (as described below).

In a preferred embodiment, each HPTT entry is organized as four 32 bit words, the first word containing a valid bit and a sufficient portion of the virtual address to identify that the entry contains the missing translation (discussed below). The second word contains protection and status bits to be inserted into the TLB 140 and any status bits managed by the software TLB miss handler. The third word contains the physical page address to be inserted into the TLB 140. The fourth word contains the address of the next PDIR entry in the linked list.

For embodiments where the page table is forward or reverse mapped, the hardware-visible table is separate from the main page table and contains a subset of the entries organized as an HPTT.

When a virtual page address translation is not found in the TLB 140, a TLB miss occurs. The present invention provides a software-assisted HW TLB miss handler which is designed to reduce the TLB miss penalty while being inexpensive to implement and requiring little area or complexity. As shown in FIG. 1, a HW miss handler 150 is provided for handling the simplest and most common TLB misses. The HW TLB miss handler 150 is directly connected to the TLB 140 and connected to main memory 170 via the MMU 180. The HW miss handler 150 allows for an efficient means of retrieving the missing translations from the PDIR located in main memory 170.

Referring again to FIG. 3, when the TLB miss occurs, the HW miss handler 150 computes the physical address of a PDIR entry based on the missing virtual address, as shown in step 320. The HW TLB miss handler 150 via MMU 180 initially searches the cache 115 for the missing translation, as shown in step 330. If the translation is present, the procedure flows to step 370. If the translation is not present, the HW TLB miss handler 150 then searches (via the MMU 180) the hardware-visible portion of the PDIR 160 in memory, as shown in step 360. The HW TLB miss handler 150 then accesses via MMU 180, the PDIR entry and checks for a correct translation. If found, the physical page address, virtual page address, and protection information of the PDIR entry are inserted into the TLB 140, as shown in step 370. The TLB retains a copy of the information for possible reuse. The original virtual address is re-translated and the TLB is searched for the physical page number, as shown in block 310. The processor 110 then searches the cache 115 for the data. If the data is not currently in the cache, a cache miss occurs. The cache 115 then retrieves the missing line from memory and normal program execution continues.

When the TLB 140 is full, it discards an old address translation to make room for the new one.

If the translation is not found in the hardware visible portion of the PDIR 160, the HW miss handler 150 will trap to software, as shown in step 380. A pointer to a PDIR entry is passed to the software TLB handler (not shown) so that the PDIR address need not be recomputed, saving substantial execution time. This is shown in step 390.

The SW TLB miss-handler completes the search of the PDIR 160, as shown in step 395, and inserts the missing translation into the TLB 140, as shown in step 370. The SW TLB miss handler also performs any page table management necessary.

FIG. 2 illustrates a schematic diagram of the HW TLB miss handler 150. The HW TLB miss handler 150 hashes the virtual page address to form a table offset or pointer to the PDIR entry address of the hardware visible table. Which specific bits to select from the virtual page address is implementation specific. In a preferred embodiment, the most significant bits are XORed with the least significant bits of the virtual page address.

The operation of HW TLB miss handler 150 will be described with reference to the following example. Note that the following example is only illustrative, and the present invention is not limited to the specific system characteristics given below. Assume the following system characteristics: (1) a 48 bit virtual byte addresses; (2) a 4 KB page size; (3) a 4 word (16 bytes) PDIR entry; and (4) 32MB of physical system memory. From these characteristics, the following conclusions can be drawn. First, with a 48 bit virtual byte address and 4 KB page size, it can be concluded that a 36 bit virtual page address is necessary. Second, since 32MB of physical memory would hold 8K physical pages, the PDIR must contain 8K PDIR entries. Third, since each PDIR entry consists of 4 words, the PDIR size will be 128 KB. Fourth, a 128 KB PDIR requires a 17 bit offset or pointer to form the physical byte address of a PDIR entry. Finally, a 32 MB physical memory requires a 25 bit physical byte address to access specific byte physical memory locations.

Given these system characteristics, and the conclusions which follow, the following restrictions and characteristics are implemented. Assume the PDIR is organized as one large HPTT. The HW TLB handler 150 restricts software to aligning the PDIR 160 to an address which is a multiple of the PDIR 160 size. A mask register 240 holds a 32 bit mask and a base register 250 holds a 32 bit base address. A tag identifier 270 is restricted to a 32 bit quantity. The tag identifier 270 consists of one valid bit (e.g., a flag) and the thirty-one most significant virtual address bits.

Furthermore, the following bit vectors are defined for this example:

| | |
|---|---|
| Virtual byte address (48 bit quantity) | VA [0:47] |
| Virtual page address (36 bit quantity) | VA [0:35] |
| Mask register value (32 bit quantity) | MASK [0:31] |
| Base register value (32 bit quantity) | BASE [0:31] |
| PDIR entry physical address (32 bit quantity) | PDIR [0:31] |
| Tag identifier (32 bit quantity) | TAG [0:31] |

As an example, assume the virtual address which produced the TLB miss is:

VA[0:47]=
100010011110111001001010010100000100001000101011.

Thus, the virtual page address for the miss translation is: VA[0:35]=100010011110111001001010010100100100.

Referring to FIG. 2, in a preferred embodiment the hashing function consists of XOR logic 210 which combines particular address bits (which are implementation specific) which are mapped out by high and low order bits to form a shorter pointer 212. The bitwise hashing function could be implemented as: hash(VA)[0:6]=0000000; hash(VA)[7]=VA[0]; hash(VA)[8:22]=VA[1:15] XOR VA[16:30]; hash(VA)[22:27]=VA[31:35]; and hash(VA)[28:31]=0000. Thus for this example, hash(VA) evaluates to: hash(VA)[0:31]= 00000001010110011000110001000000.

A brief discussion of the selected hashing function is necessary at this point. The XOR logic combines the high order bits with the low order bits to provide a more uniform distribution of pointer references over periods when multiple processes execute. The high order virtual address bits are typically assigned by the OS at execution time and uniquely identify the address space of a specific concurrent process. The low order bits assignments are often unevenly distributed, with similar distributions occurring in each process, resulting in a high degree of low order address locality between processes. In the preferred embodiment, the OS pseudo-randomly assigns the high order bits (or space identifiers). Using the XOR logic to combine the pseudo-random high order bits with the non-random low order bits results in a more uniform distribution of pointer references. Thus, missing virtual address translations from multiple processes do not map to a limited set of PDIR entries, but instead map to wide set of PDIR entries. This greatly increases the probability that the missing translations will be contained in the first entries of the linked list of PDIR entries, even with many concurrent processes executing. It also reduces the probability that the missing translations will share the same linked list of PDIR entries, requiring a traversal of the linked list to find the missing translation.

Since the tag identifier contains the 31 MSBs of the virtual address, any bits VA[0:30] may be combined in the hashing function without losing the ability to identify the entry containing the missing translation. A two input XOR was chosen for hardware simplicity, requiring 15 parallel two bit XOR gates and a 30 virtual address bit input. VA[0:15] represents the space identifier assigned by the OS and VA[16:35] is the remainder of the virtual address identifying the page within the address space. VA[0] was chosen arbitrarily to remain unhashed since the two bit XOR gates require an even number of bits VA[0:30]. Bits VA[31:35] remain unhashed, are never masked (below), and do not need to be included in the tag identifier since they uniquely determine the values of hash(VA)[22:27]. Hashing function bit alignment within the pointer is chosen so that the pointer represents the physical address of the first byte of a 16 byte (4 word) PDIR entry. Thus, hash(VA)[28:31] must be 0000. Bits hash(VA)[0:6] are undetermined and are arbitrarily set to 0 and can always be masked (below).

Since VA[31:35] are not included in the tag identifier, they must never be masked in this example. This restricts physical memory size to a lower limit of 128KB or 32 PDIR entries. In this example, an upper limit of 8GB is imposed since the hashing function does not determine hash(VA) [0:6]. These bits may always be masked.

The Most Significant bits (MSBs) of the shorter pointer 212 are masked out to a varying degree by a bitwise logical AND function 220 with a mask register 240. This allows the range of the pointer to be varied with the PDIR size. As stated above, the lower 17 bits are necessary to form an offset byte address (PDIR pointer) for the PDIR entry. Thus, the value of the mask register is: MASK [0:31]= 00000000000000011111111111111111. The result of the bitwise logical AND function 220 is: MASK(hash(VA), MASK) [0:31]= 00000000000000000011000110001000000.

The resulting pointer 225 is merged with the MSB significant bits of a base address register to form the physical address 260 of the PDIR entry. This merging function is implemented with a bitwise logical OR function 230 which requires less hardware complexity than adding the pointer to the PDIR base register. Consequently, software assists the address generation by insuring that the base register address is a multiple of the PDIR size, and thus eliminating the need for an adder.

Once again, it is known that the lower 17 bits are necessary to form an offset byte address for the PDIR entry. As discussed above, the PDIR entry must be aligned to a multiple of its size in physical memory and a 25 bit physical byte address is required to access a specific byte in main memory 170. Consequently, only 8 bits are needed to determine the base address of the PDIR 160. BASE [0:31] =0000000dddddddd00000000000000000, where "d" denotes the bit positions which determine the base address. All other base address bits (besides those denoted with a d) must be set to zero.

For this example, the PDIR 160 is aligned to the last possible location in physical memory. This means that the 8 determining bits should be "11111111" and the value of the base address register should be: BASE[0:31]= 00000001111111100000000000000000. Thus, the bitwise OR function evaluates to: merge(mask(hash(VA),MASK), BASE)[0:31]=00000001111111111000110001000000= PDIR[0:31], where PDIR[0:31] is the PDIR entry physical address 260.

PDIR Access and Tag Comparison

As mentioned above, each PDIR entry 260 contains a tag identifier 270, protection information, status bits, the physical page address, and the physical address of the next PDIR entry in the linked list. PDIR entries are contained in single cache lines so that only one cache miss penalty is incurred if the MMU 180 must bring in the line from main memory 170. The tag identifier 270 consists of the virtual page address MSBs which were hashed or potentially masked out of the PDIR entry physical address. The tag identifier also contains a valid bit that indicates a valid PDIR entry. It uniquely identifies the PDIR entry containing the correct virtual to physical address translation. The HW TLB miss handler 150 compares with comparator 280 the tag identifier 270 with the missing virtual page address MSBs to determine if the entry contains the missing translation.

The tag identifier is defined as: TAG[0]=valid bit and TAG[1:31]=VA[0:31]. Note that bits [31:35] do not need to be included in the tag identifier since the value of these bits are not lost in the PDIR address generation. The tag comparison function could be implemented as:

if (TAG[0] == TRUE) and (TAG[1:31] == VA[0:30])
then
    TAG MATCHES
else
    TAG DOES NOT MATCH For this example, a matching tag identifier would be: 11000100111101110010010100101000

The PDIR entry physical address 260 is issued to the memory management unit (MMU) 180 which determines if the entry is resident in the cache memory 160. If not, the MMU 180 brings in the line from main memory 170 containing the entry and puts it in the cache memory 115. The line must be in main memory 150 since the entire PDIR is resident in main memory 170. Once the line is in the cache memory 115, the HW TLB miss handler 150 may access the PDIR entry in the cache memory 115.

It is at this point that the tag identifier in the PDIR entry is checked against the MSB's of the virtual address (as defined above). If the comparison produces a match, then the HW TLB miss handler 150 is certain that it has the correct translation. However, if the MSB's of the virtual address and the tag identifier do not match, then the HW TLB miss handler 150 traps to the software TLB miss handler (not shown).

The comparison is necessary since a mismatch would occur if the PDIR entry contained the translation for a different virtual address which is possible since a many-to-one hashing function is used to generate the pointer to the PDIR entry.

The HW TLB miss handler 150 also checks a status bit which indicates if the HW TLB miss handler 150 is capable of completing the service of the TLB miss. The status bit is managed by the software miss handler and provides a signal to the HW TLB miss handler 150 that the SW TLB miss handler must intervene to complete the service of the TLB miss, typically for PDIR entry modifications and/or page table management. If these checks pass, then the protection and the physical page address are inserted into the TLB 140. If they fail, the HW TLB miss handler 150 selects either the current PDIR entry address or the next PDIR entry address depending on the status checks. The current PDIR entry address is selected if the status bit indicates the HW TLB miss handler 150 is not capable of completing the service of the TLB miss or if the valid bit is falser (TAG[0]=0). Otherwise, the next PDIR entry address is selected if the tag identifier 270 does not match the most significant bits of the virtual address. The selected address is placed in a control register accessible by software. The HW TLB handler 150 then traps to the software TLB miss handler (not shown) which completes the service of the TLB miss.

Second Level TLB Comparison

The software-assisted HW TLB miss handler is less complex and more economical than a second level TLB. As discussed in the background section, previous second level TLB implementations require additional memory or reserved memory in the cache or tag RAMS to hold translations which increases the cost of the cache system.

In contrast, the HW TLB miss handler 150 of the present invention does not require reserved cache memory. Instead, the HW TLB miss handler 150 via MMU 180 accesses the PDIR entry in regular cache memory. Since the MMU 180 must initially bring in the cache line from main memory 170 containing the PDIR entry in either scheme, the HW TLB miss handler 150 actually implements a more economical translation buffer because no part of the cache memory is reserved for the specific purpose of buffering translations. No additional pins are required and the regular MMU cache control can be used to access the PDIR entry in cache or in memory. Similar access times can be achieved in either scheme assuming the PDIR is cache resident. If the PDIR must be brought in from main memory 170, the TLB miss penalty increases by the amount of a cache miss penalty. A second level TLB miss, however, traps to a software TLB handler (discussed below) and generally incurs a much larger increase in the TLB miss penalty.

Software TLB Miss Handler Comparison

The software assisted HW TLB miss handler of the present invention out performs software TLB miss handling routines. Previous software routines performed many similar operations to those performed by the HW TLB handler 130. These include: 1) trapping to the miss handler; 2) saving and restoring previous register state; 3) PDIR address generation; 4) PDIR entry access; 5) tag comparison and status check; 6) TLB inserts; 7) traversing PDIR linked lists; 8) Updating the reference status bit; 9) managing the PDIR; 10) trapping to page fault routines; and 11) returning to normal program execution.

Each operation takes a fixed number of clock cycles to complete. Using a previous software TLB miss handler routine, a contrast in performance may be drawn, as described below.

Trapping to the software handler requires 5 cycles since normal program is suspended while the handler executes. A trap is not required to start the hardware handler routine since normal program execution is only halted. The software handler must spend time saving and restoring register state which the hardware handler does not have to do because it contains its own dedicated registers to hold the virtual address, tag, and PDIR entry pointer. This saves approximately 5 cycles. With its dedicated hardware, the hardware handler can generate the PDIR address in 2 cycles while the same operation in software takes 7 cycles. The PDIR entry access requires 4 cycles in either case, assuming the PDIR entry is in cache.

The tag comparison and status check is done in parallel with the PDIR entry access and thus requires 0 cycles with hardware but requires 2 cycles with software. TLB inserts (putting the missing virtual to physical translation into the TLB) requires 10 cycles in software but only 2 cycles with the hardware handler.

The hardware handler does not traverse PDIR lists, update status, manage the PDIR 160, or trap to the page fault routines. Instead, it relies on software assistance if these complex operations are needed. This reduces the hardware handler's circuit and control complexity since these operations are only performed if the tag comparison and status check fails. Since in executing many program applications, the HW TLB miss handler 150 has a relatively high chance of completing service of the TLB miss without software assistance, this is a good design trade off that results in a better, more economical design than previous schemes for TLB miss handling. The task of modifying the translation tables is given to software to simplify the hardware and give software more flexibility when modifying an entry. It also allows software to keep track of and manage more information on the type of accesses being made. This software/hardware coupling is a crucial differentiator of the design of the present invention.

Finally, returning to normal program execution requires 7 cycles in software and only 2 cycles with the TLB miss handler. Thus, comparing the cycle counts shows a 10 cycle miss penalty for the hardware TLB handler vs. 40 cycles for the software TLB miss handler for simple TLB misses.

Besides the potentially much faster TLB miss handling, the HW TLB miss-handler 150 can have an important advantage in multiprocessor systems. Since hardware can atomically fetch the entire table entry, it simplifies synchronization with the other processors, especially if it does not attempt to update entries.

Hardware TLB miss handler comparison

The software-assisted HW TLB handler can be differentiated with pure hardware TLB miss algorithms by its economical division between tasks required every TLB miss that are performed by hardware and tasks that are conditionally required for a more complex TLB miss that are performed by software. Consequently, a significant savings in hardware circuits and control is achieved.

While the invention has been particularly shown and described with reference to preferred embodiments thereof, it will be understood by those skilled in the art that various changes in form and details may be made therein without departing from the spirit and scope of the invention.

What is claimed is:

1. A computer-based system for handling translation lookaside buffer (TLB) misses, the system comprising:
   (a) a memory unit for storing blocks of data, wherein each block of data is accessed via a virtual address;
   (b) a TLB for storing address translation information for translating said virtual address to a physical address for each block of data in said memory unit;
   (c) a hardware TLB miss handler, coupled to said TLB, adapted to hash said virtual address to form a physical address pointer into a physical page directory, and further adapted to check a hardware-visible portion of said physical page directory for a missing translation; and
   (d) a software TLB miss handler adapted to accept said physical address pointer from said hardware TLB miss handler if said hardware TLB miss handler does not locate the missing translation in the hardware-visible portion of said physical page directory, said software TLB miss handler being further adapted to check the remainder of said physical page directory for the missing translation.

2. The system of claim 1, wherein said software TLB miss handler is further adapted to assist with modifications to any entries in said physical page directory and management of said physical page directory.

3. The system of claim 1, further comprising a cache memory system which holds recently accessed entries of said physical page directory, wherein no specific portion of said cache memory system is reserved for buffering translations.

4. The system of claim 1, wherein said physical page directory is located in said memory unit.

5. The system of claim 1, wherein each entry in said physical page directory contains a tag identifier, protection information and status bits, a physical address, and a physical address to the next entry in said physical page directory.

6. The system of claim 5, further comprising comparison means for comparing said tag identifier with the most significant bits of said virtual address to determine if the entry in said physical page directory pointed to by said physical address pointer contains said address translation information.

7. In a computer-based system having a translation lookaside buffer (TLB) which is adapted to accept a virtual address and return a physical address translation, a method for handling TLB misses, comprising the steps of:

(1) generating with a hardware TLB miss handler a physical address pointer into a physical page directory based on the virtual address to locate the physical address translation;

(2) searching a hardware-visible portion of said physical page directory for the physical address translation using said physical address pointer;

(3) trapping to a software TLB miss handler if said hardware-visible portion of said physical page directory does not contain the physical address translation, wherein said physical address pointer is passed to said software TLB miss handler during said trapping step; and (4) searching with said software TLB miss handler the remainder of said physical page directory for the physical address translation using the physical address pointer.

8. The method of claim 7, further comprising the step of storing the physical address translation into the TLB if it is located in either steps (2) or (3).

9. The method of claim 7, further comprising the step of searching, using said physical address pointer, a cache memory unit which stores recently used portions of said physical page directory for the physical address translation.

10. The method of claim 7, further comprising the step of comparing a tag identifier located within an entry in said physical page directory pointed to by said physical address pointer with the most significant bits of the virtual address to determine if said entry in said physical page directory contains the physical address translation.

11. The method of claim 7, further comprising the step of checking a status bit within an entry in said physical page directory pointed to by said physical address pointer to determine whether said hardware TLB miss handler can complete the service of the TLB miss.

12. In a system that supports virtual memory translation by utilizing a translation lookaside buffer (TLB), the TLB containing a subset of translations stored in a physical page directory, a method to retrieve data from a cache memory system, comprising the steps of:

(1) providing a virtual address to the TLB;

(2) searching the TLB for a physical address translation to said virtual address, and if found, searching the cache memory system for the data, otherwise producing a TLB miss signal;

(3) generating with a hardware TLB miss handler a physical address pointer into said physical page directory based on said virtual address to locate said physical address translation;

(4) searching a hardware-visible portion of said physical page directory for said physical address translation using said physical address pointer;

(5) trapping to a software TLB miss handler if said hardware-visible portion of said physical page directory does not contain said physical address translation, wherein said physical address pointer is passed to said software TLB miss handler during said trapping step; and (6) searching with said software TLB miss handler the remainder of said physical page directory for said physical address translation using said physical address pointer.

13. A computer-based system for handling translation lookaside buffer (TLB) misses, the system comprising:

(a) a memory unit for storing blocks of data, wherein each block of data is accessed via a virtual address;

(b) a TLB for storing address translation information for translating said virtual address to a physical address for each block of data in said memory unit;

(c) a hardware TLB miss handler, coupled to said TLB, adapted to hash said virtual address to form a physical address pointer into a physical page directory, and further adapted to check a hardware-visible portion of said physical page directory for a missing translation, wherein said hardware TLB miss handler comprises:

hashing means for hashing said virtual address to form a first pointer by XORing the most significant bits of said virtual address with the least significant bits of said virtual address;

masking means for performing a bitwise logical AND function on said first pointer and a mask register to form a second pointer;

merging means for performing a bitwise logical OR function on said second pointer and the most significant bits of a base address register to form said physical address pointer; and means for insuring that said base address register is a multiple of the size of said physical page directory; and (d) a software TLB miss handler adapted to accept said physical address pointer from said hardware TLB miss handler if said hardware TLB miss handler does not locate the missing translation in the hardware-visible portion of said physical page directory, said software TLB miss handler being further adapted to check the remainder of said physical page directory for the missing translation.

* * * * *